US009654482B2

(12) United States Patent
Gagliano et al.

(10) Patent No.: US 9,654,482 B2
(45) Date of Patent: May 16, 2017

(54) OVERCOMING CIRCULAR DEPENDENCIES WHEN BOOTSTRAPPING AN RPKI SITE

(71) Applicant: Cisco Technology, Inc., San Jose, CA (US)

(72) Inventors: Roque Gagliano, Pully (CH); Alvaro E. Retana, Raleigh, NC (US); Keyur P. Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/160,968

(22) Filed: Jan. 22, 2014

(65) Prior Publication Data

US 2015/0207818 A1 Jul. 23, 2015

(51) Int. Cl.
*H04L 29/06* (2006.01)

(52) U.S. Cl.
CPC .......... *H04L 63/108* (2013.01); *H04L 63/029* (2013.01)

(58) Field of Classification Search
CPC ... H04L 63/20; H04L 63/0227; H04L 63/029; H04L 63/108
See application file for complete search history.

(56) References Cited

U.S. PATENT DOCUMENTS

| 5,325,404 A | 6/1994 | Bigey et al. |
| 6,584,535 B1 | 6/2003 | Ouellet et al. |
| 7,139,923 B1 | 11/2006 | Chapman et al. |
| 7,469,328 B1 | 12/2008 | Mak et al. |
| 8,782,738 B2* | 7/2014 | Lynch ................................ 726/2 |
| 2007/0109959 A1 | 5/2007 | Koren et al. |
| 2009/0080436 A1* | 3/2009 | White et al. ............. 370/395.31 |
| 2010/0284403 A1* | 11/2010 | Scudder ........................ 370/392 |
| 2012/0017259 A1* | 1/2012 | MacCarthaigh .. H04L 29/12066 726/1 |

OTHER PUBLICATIONS

Bush et al., "The Resource Public Key Infrastructure (RPKI) to Router Protocol," Internet Engineering Task Force, Request for Comments 6810, Jan. 2013, 27 pages.
Bush. "RPKI-Based Origin Validation Operation," Network Working Group, Internet Draft, draft-ietf-sidr-origin-ops-19, Aug. 2012, 10 pages.
Rekhter et al., "A Boarder Gateway Protocol 4 (BGP-4)," Network Working Group, Request for Comments 1771, Mar. 1995, 1 page.

* cited by examiner

*Primary Examiner* — Saleh Najjar
*Assistant Examiner* — Devin Almeida
(74) *Attorney, Agent, or Firm* — Parker Ibrahim & Berg LLC; James M. Behmke; Stephen D. LeBarron

(57) ABSTRACT

In one embodiment, a validation server in a computer network determines that an edge router of the computer network has blocked access to a desired server address based on the edge router not having authentication information for the desired server address. In response, the server creates a white-listing policy to temporarily allow access to the desired server address at the edge router, and sends the white-listing policy to the edge router. The validation server may then proceed with performing server fetching operations to the desired server address from the validation server while the white-listing policy is in effect, and instructs the edge device to remove the white-listing policy once the server fetching operations are completed.

21 Claims, 9 Drawing Sheets

OVERCOMING CIRCULAR DEPENDENCIES WHEN BOOTSTRAPPING AN RPKI SITE

TECHNICAL FIELD

The present disclosure relates generally to computer networks, and, more particularly, to overcoming circular dependencies when bootstrapping a Resource Public Key Infrastructure (RPKI) site.

BACKGROUND

An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs. To facilitate the routing of network traffic through one or more ASes, the network elements of the ASes need to exchange routing information to various network destinations. Border Gateway Protocol (BGP) is an exterior gateway protocol (EGP) that is used to exchange routing information among network elements (e.g., routers) in the same or different ASes. A computer host that executes a BGP process is typically referred to as a BGP host or a BGP device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

To validate the trustworthiness of the exchanged routing information, various authentication or validation techniques have been used and proposed, such as the Resource Public Key Infrastructure (RPKI), which can be used by legitimate holders of the resources to control the operation of Internet routing protocols to prevent route hijacking and other attacks. In particular, RPKI is often used to secure BGP through BGPSEC (BGP Security) or Origin AS Validation, as well as Neighbor Discovery Protocol (ND) for IPv6 through the Secure Neighbor Discovery Protocol (SEND).

Notably, when booting a (new) edge router using a security protocol such as Origin AS or BGPSEC, the RPKI cache system is empty. Consequently, all paths in the edge routers are set to a "NOT FOUND" or "INVALID" state (Origin AS and BGPSEC, respectively). If the router is configured to discard/drop "NOT FOUND" or "INVALID" paths, a circular dependency is created between the RPKI validation servers and the edge routers, as the validation servers will not be able to traverse the edge router to reach external validation servers, such as domain name service (DNS) servers needed to resolve publication points' URLs (Universal Resource Locators), nor the RPKI repository system itself, nor external network time protocol (NTP) servers also required for validation. Additionally, a circular dependency could also happen through an improper design of the repository system, particularly if IP addresses for the DNS resolving servers and the publication points are all hosted in an unreachable location.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
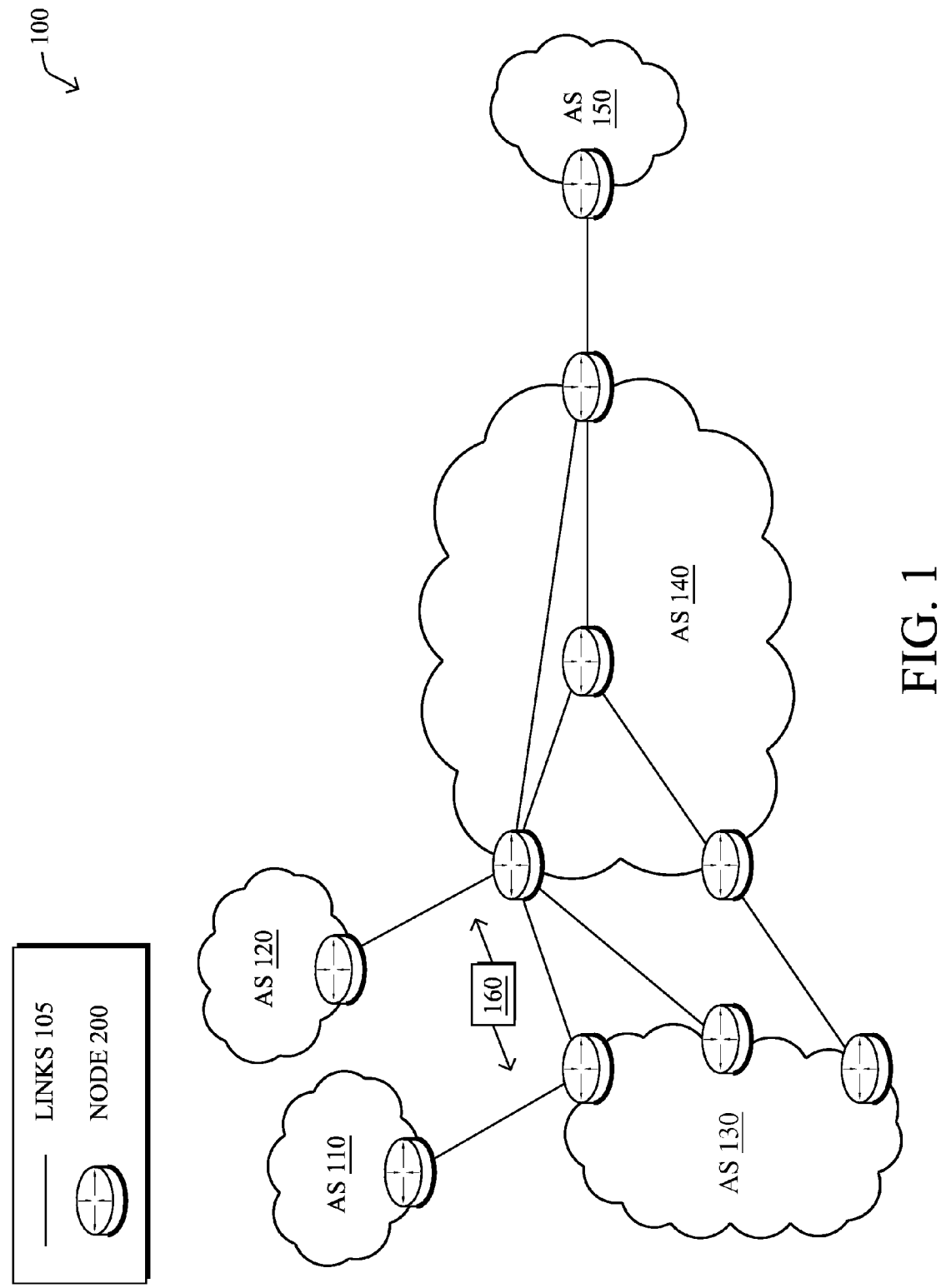
FIG. 1 illustrates an example simplified communication network including one or more ASes.

According to one or more embodiments of the disclosure, a validation server in a computer network determines that an edge router of the computer network has blocked access to a desired server address based on the edge router not having authentication information for the desired server address. In response, the server creates a white-listing policy to temporarily allow access to the desired server address at the edge router, and sends the white-listing policy to the edge router. The validation server may then proceed with performing server fetching operations to the desired server address from the validation server while the white-listing policy is in effect, and instructs the edge device to remove the white-listing policy once the server fetching operations are completed.

According to one or more additional embodiments of the disclosure, an edge router blocks access to a range of addresses based on the edge router not having authentication information for the range of addresses (e.g., at boot-up), and receives a white-listing policy from a validation server in the computer network to temporarily allow access to at least a desired server address at the edge router within the range of addresses. As such, the edge router complies while the white-listing policy is in effect, and removes the white-listing policy in response to instructions received from the validation server.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 2:
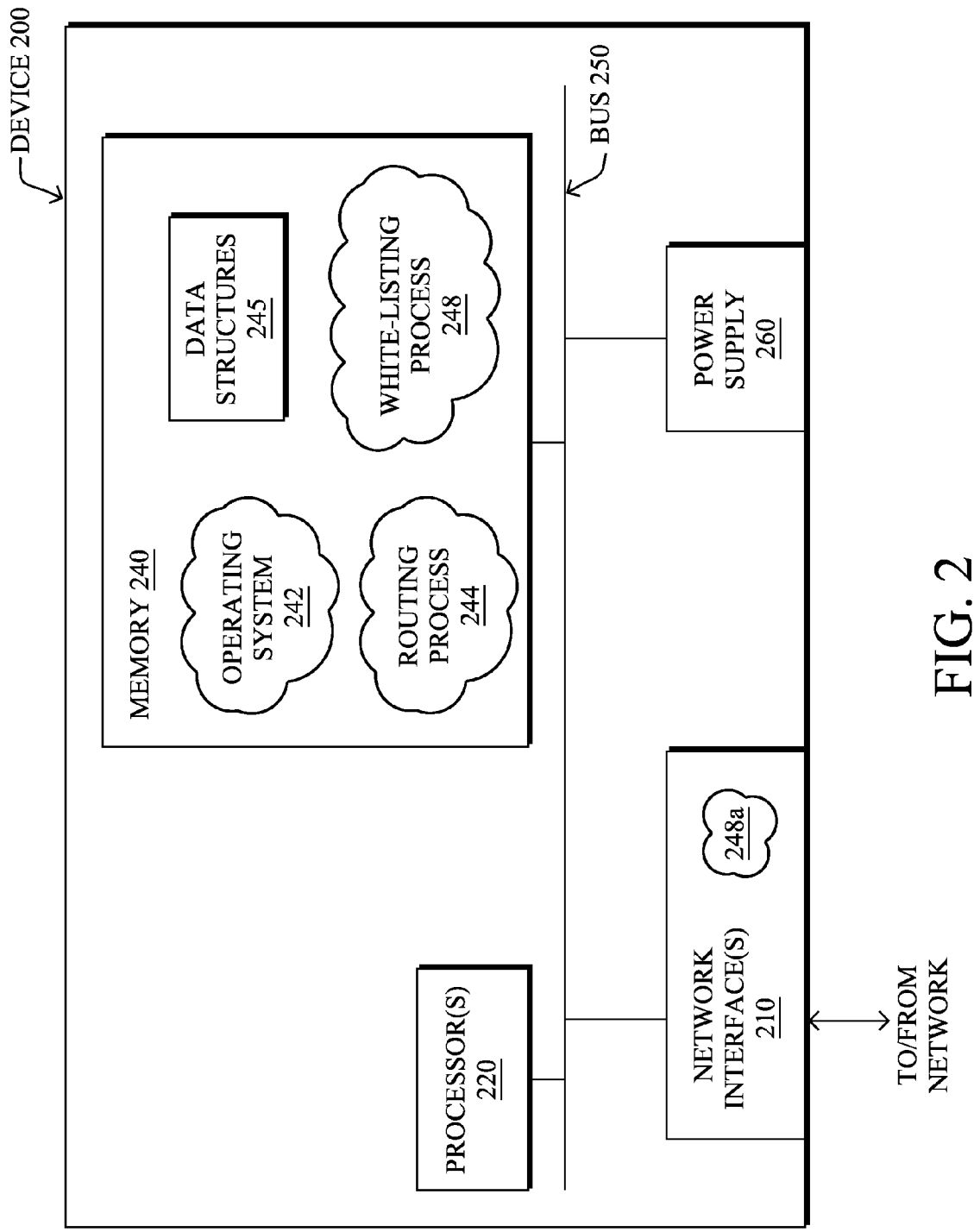
FIG. 2 illustrates an example simplified network device/node.

FIG. 1 is a schematic block diagram of an example computer network 100 illustratively comprising nodes/devices 200 (e.g., as depicted in FIG. 2) interconnected by various methods of communication. For instance, the links 105 may be any suitable combination of wired links and shared media (e.g., wireless links, etc.) where certain nodes 200, such as, e.g., routers, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 160 (e.g., traffic and/or messages sent between the devices/nodes) may be exchanged among the nodes/devices of the computer network 100 using predefined network communication protocols such as certain known wired protocols, as well as wireless protocols or other shared-media protocols where appropriate.

The computer network 100 includes a set of autonomous systems (AS) 110, 120, 130, 140 and 150. The computer network 100 may be positioned in any suitable network environment or communications architecture that operates to manage or otherwise direct information using any appropriate routing protocol or data management standard. For example, computer network 100 may be provided in conjunction with a border gateway protocol (BGP).

As noted above, an AS is a collection of connected Internet Protocol (IP) routing prefixes under the control of one or more network operators that presents a common, clearly defined routing policy to the Internet. Usually, an AS comprises network devices, e.g., nodes/devices 200, that are established on the edge of the system, and that serve as the system's ingress and egress points for network traffic. Moreover, the devices 200 may be considered edge devices, border routers, or core devices within the respective AS. These network elements typically, but not always, are routers or any other element of network infrastructure suitable for switching or forwarding data packets according to a routing protocol or switching protocol. For the purposes of the present disclosure, the network elements located within an AS may alternatively be referred to as "forwarding devices" or "intermediate devices." Moreover, for illustration purposes, the ASes 110, 120, 130, 140 and 150 are shown with a limited number of devices 200. In an actual implementation, however, an AS normally comprises numerous routers, switches, and other elements.

Each AS 110, 120, 130, 140 and 150 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the devices 200 within the ASes, the devices need to exchange routing information to various network destinations. As described above, BGP is conventionally used to exchange routing and reachability information among network elements, e.g., devices 200, within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information includes the complete route to each network destination, e.g., "destination device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., links 105, may be referred to as an "AS_PATH." The AS_PATH attribute indicates the list of ASes that must be traversed To reach the address destination. For example, as illustrated in FIG. 1, the AS 130 may store an AS_PATH attribute of "110 120 140 150" where the address destination is the AS 150 (or a particular IP address within AS 150). Here, the AS_PATH attribute indicates that the path to the address destination AS 150 from AS 130 passes through ASes 110, 120 and 140, in that order.

Although in certain embodiments it is preferable that all devices 200 in the respective ASes 110, 120, 130, 140 and 150 be configured according to BGP, in a real-world implementation, it may be unlikely that each device communicates using BGP. Thus, certain embodiments are applicable to scenarios where all devices 200 in the network 100 are configured according to BGP, as well as scenarios where only a subset of the devices 200 is configured as such. Moreover, between any of the ASes, there may be a single communication path 105, e.g., between AS 110 and AS 130, as shown in FIG. 1, or there may be multiple communication paths 105, e.g., between AS 120 and AS 140. Thus, certain embodiments are applicable to either case, as described in further detail below.

A security extension to the BGP, referred to as BGPSEC, may provide improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates may allow a relying party to verify that a BGPSEC signature was produced by a BGP speaker belonging to a given AS. In certain embodiments, a goal of BGPSEC is to use signatures to protect the AS Path attribute of BGP update messages so that a BGP speaker can assess the validity of the AS Path in update messages that it receives.

FIG. 2 is a schematic block diagram of an example node/device 200 that may be used with one or more embodiments described herein, e.g., as any of the nodes/devices shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.). Furthermore, the device 200 may be part of an AS, as illustrated in FIG. 1.

The network interface(s) 210 contain the mechanical, electrical, and signaling circuitry for communicating data over links 105 coupled to the network 100, and thus effecting communication among the ASes 110, 120, 130, 140 and 150. The network interfaces may be configured to transmit and/or receive data using a variety of different communication protocols. The nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, in accordance with BGP or BGPSEC, for example, and an illustrative "white-listing" process 248, as described herein. While white-listing process 248 is shown in centralized memory 240, alternative embodiments provide for the process to be specifically operated within the network interfaces 210 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as a BGP or BGPSEC, as described above. Alternatively, or additionally, the routing process 244 may be configured according to a non-BGP protocol, such as various proactive or reactive routing protocols, as will be understood by those skilled in the art. As described above, the disclosed embodiments are applicable to cases where each router in a single AS, or in several ASes, follows BGP, as well as cases where only a subset of routers follow BGP, whereby the remaining routers are configured according to a different routing protocol. In either case, functions may, on capable devices, be configured to manage a routing/forwarding table (a data structure 245) containing, e.g., data used to make routing/forwarding decisions. In the case of BGP, for example, the BGP logic of a router, e.g., routing process 244, is used to collect BGP AS_PATH information from BGP tables of border routers, e.g., "peers," of an AS, To construct paths to various destinations. BGP peers exchange or advertise routes using information stored in their routing table, e.g., a data structure 245, via the BGP UPDATE message.

As noted above, to validate the trustworthiness of the exchanged routing information, various authentication or validation techniques have been used and proposed. For example, RPKI, also known as Resource Certification, is a specialized public key infrastructure (PKI) framework designed to secure the Internet's routing infrastructure. In particular, as understood in the art, RPKI provides a way to connect Internet number resource information (such as Autonomous System numbers and IP Addresses) to a trust anchor. Illustratively, the certificate structure can mirror the way in which Internet number resources are distributed. That is, resources are initially distributed by the IANA to the Regional Internet Registries (RIRs), who in turn distribute them to Local Internet Registries (LIRs), who then distribute the resources to their customers. RPKI can be used by the legitimate holders of the resources to control the operation of Internet routing protocols to prevent route hijacking and other attacks. In particular, RPKI is often used to secure BGP through BGPSEC or BGP Origin AS Validation, as well as Neighbor Discovery Protocol (ND) for IPv6 through the Secure Neighbor Discovery Protocol (SEND).

As also noted above, when booting a (new) edge router using a security protocol such as Origin AS or BGPSEC, the RPKI cache system is empty. Consequently, all paths in the edge routers are set to a "NOT FOUND" or "INVALID" state (Origin AS and BGPSEC, respectively). If the router is configured to discard/drop "NOT FOUND" or "INVALID" paths, a circular dependency is created between the RPKI validation servers and the edge routers, as the validation servers will not be able to traverse the edge router to reach external validation servers, such as domain name service (DNS) servers needed to resolve publication points' URLs (Universal Resource Locators), nor the RPKI repository system itself, nor external network time protocol (NTP) servers also required for validation. Additionally, a circular dependency could also happen through an improper design of the repository system, particularly if IP addresses for the DNS resolving servers and the publication points are all hosted in an unreachable location. As a simple example, assume that a signed object for the prefix 10.0.0.0/8 is depending on accessing a repository located at 10.1.1.1 and/or DNS servers also at 10.2.2.2. The circular dependency is given as there is no way for the RPKI validator to access the signed objects and thus allow transit to the 10.0.0.0/8 destinations.

Overcoming Circular Dependencies

Certain embodiments of the present disclosure address how an RPKI caching system can inform the edge routing that it is trying to access an external validation server (e.g., either DNS or NTP or repository data) and that access to these resources should be provided independently of the validation state of the known paths. Said differently, certain embodiments of the present disclosure create white-list "holes" in the RPKI information such that an RPKI cache server can send validation requests through the edge routers, thus facilitating the access to critical information (such as DNS, certificates, and route origin authentications (ROAs)). As described in greater detail below, certain embodiments dynamically set and withdraw routing white-listing policies by hosting DNS/NTP servers in the validation server, and by querying the edge routers to create the appropriate policy. Certain embodiments may be particularly relevant for origin validation when the routers are configured with policies that drop "NOT FOUND" states for BGP origin validation and policies to drop "INVALID" states in BGPSEC.

Illustratively, the techniques described herein may be performed by hardware, software, and/or firmware, such as in accordance with the "white-listing" process 248 (248a), which may contain computer executable instructions executed by the processor 220 (or independent processor of interfaces 210) to perform functions relating to the techniques described herein. For example, the techniques herein may be treated as extensions to the RPKI protocol or BGP, or other suitable authentication/validation and/or communication protocols, and as such, may be processed by similar components understood in the art that execute those protocols, accordingly. Moreover, the white-listing process 248 may be hosted within a validation service (e.g., an RPKI cache server), or within the edge routers, depending upon the particular functionality described herein.

Figure 3B:
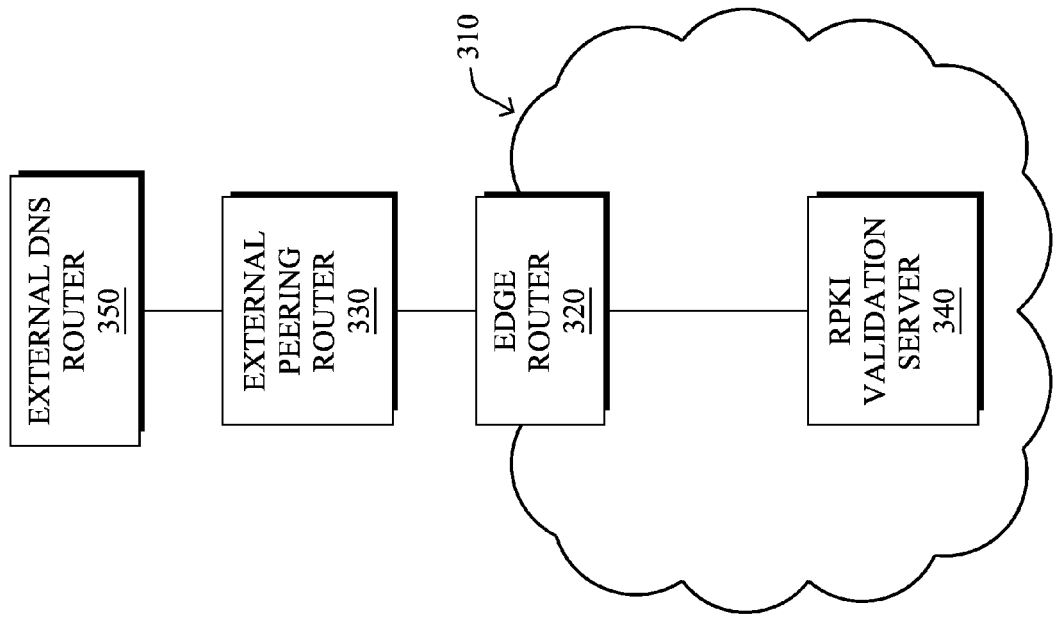
FIGS. 3A-3B illustrate alternative views of simplified computer networks.
Figure 3A:
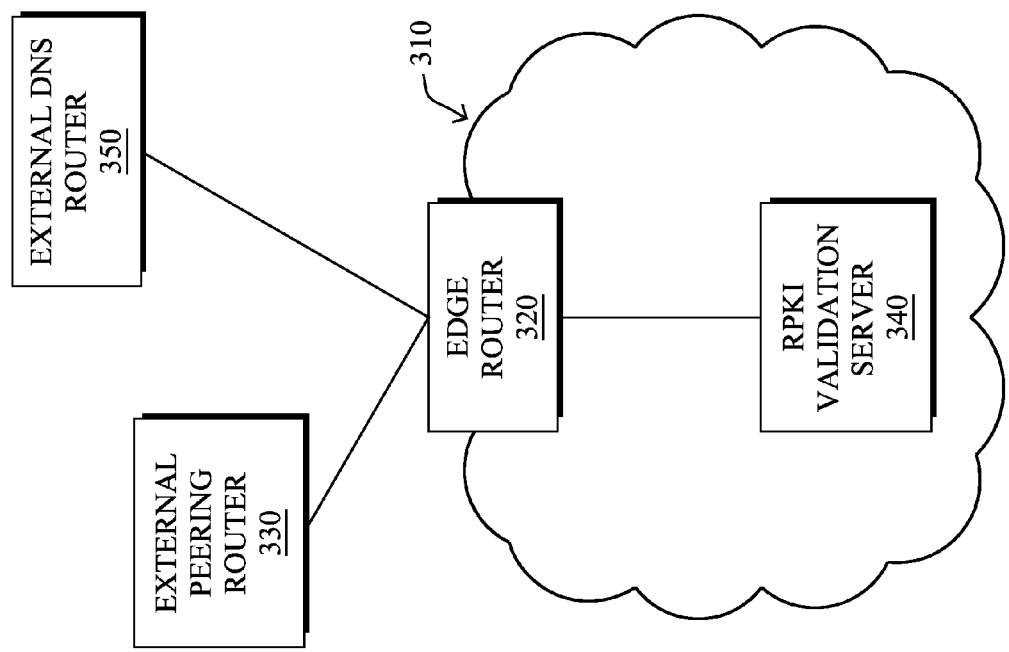

Operationally, with reference to FIGS. 3A-3B, the techniques herein may be used with a simple system with one RPKI Validation server 340 (cache server) connected to all possible edge routers 320 of its network (AS) 310, e.g., using the RPKI Router (RTR) protocol (RFC 6810). More complex scenarios are possible, such as having multiple servers, where signaling would be configured between cache servers. As shown in FIG. 3A, the edge router 320 for network 310 connects to an external peering router 330 and separately (i.e., not through peering router 330) to an external DNS server (or other types of servers as mentioned herein). Other configurations are possible, such as the DNS server 350 being specifically located behind the external peering router 330, as shown in FIG. 3B, or else various configurations of multiple edge routers, multiple peering routers, multiple DNS servers, etc., and the view shown herein is merely for example.

According to one or more embodiments of the techniques herein, the RPKI Validation Servers 340 (cache servers) for each network also host a DNS recursive server To resolve all the domains for publication points. When a cache server needs to originate a packet to access either an NTP server or a DNS server or an RPKI repository server to fetch RPKI material, it first checks whether the address of the packet is included in an already validated ROA. If this is not the case, then the validation cache server will proceed to "white-list" the corresponding IP Prefix to its neighboring edge routers, such as by adding the IP Prefix in a RTR protocol message payload (e.g., extending the standard RTR notify method). The edge routers who have received that particular prefix (e.g., as a match or a superset prefix) will react by allowing traffic with destination the white-listed prefix. Once the RPKI fetching operation has ended, the cache server will withdraw the white-listed prefixes.

Figure 4B:
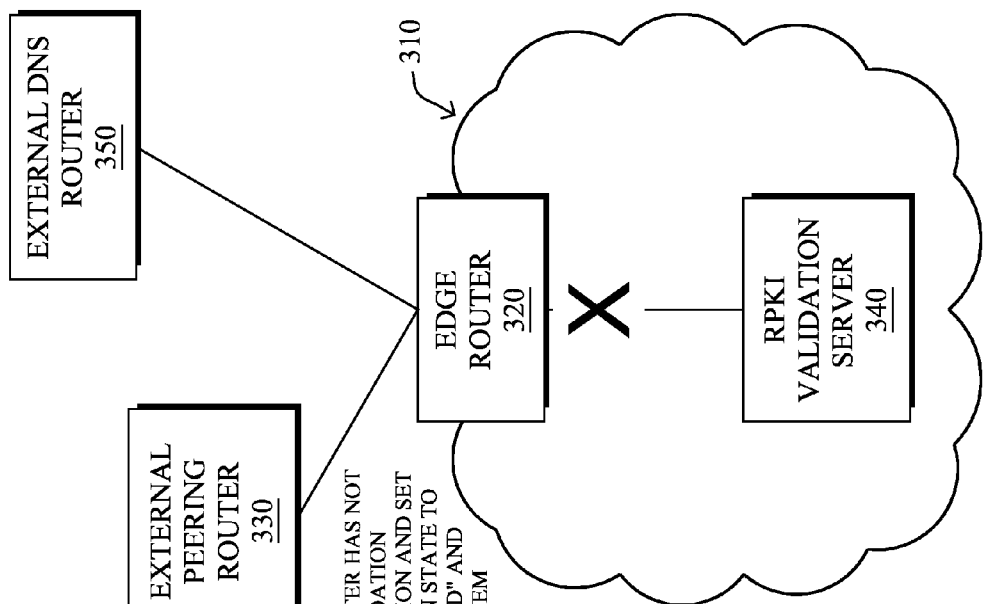
FIGS. 4A-4G illustrate an example of overcoming circular dependencies.
Figure 4A:
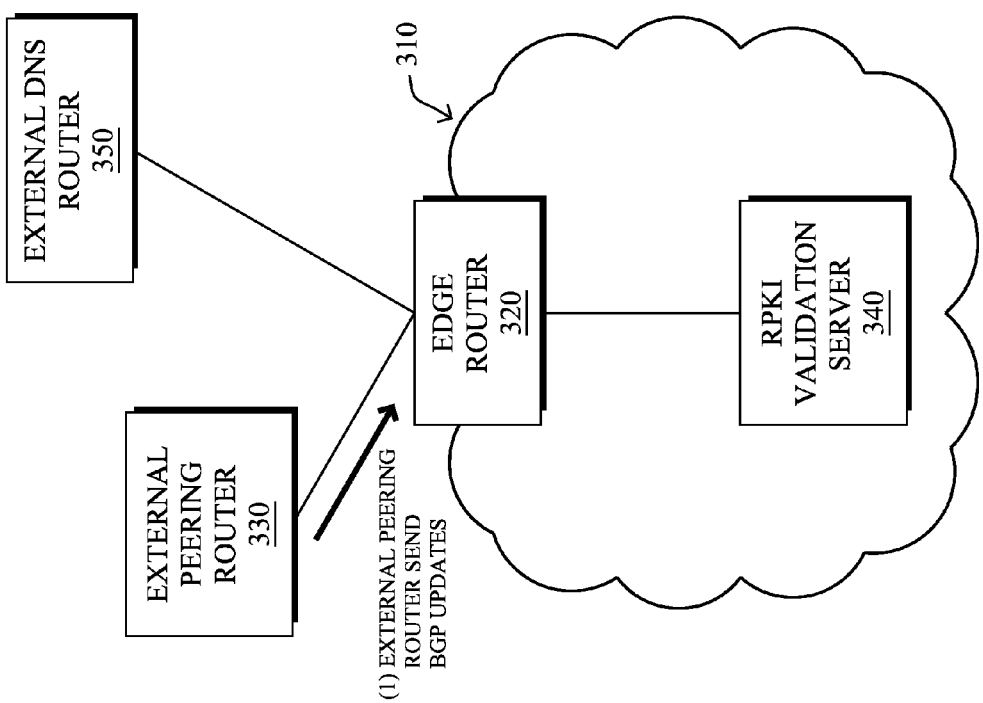

As an example of dynamically setting and withdrawing policies to an edge router, and with reference to FIGS. 4A-4G (which illustrate the network topology of FIG. 3A merely as an example), one edge router 320 and one RPKI validation server 340 are used for BGP AS Origin Validation. In FIG. 4A (step 1), the external peering router 330 may send peering BGP updates to the newly booted edge router 320. As in FIG. 4B, since the edge router has no RPKI validation information yet stored, it sets all of its origin states to "NOT FOUND" (or "INVALID") and filters them (step 2).

Figure 4D:
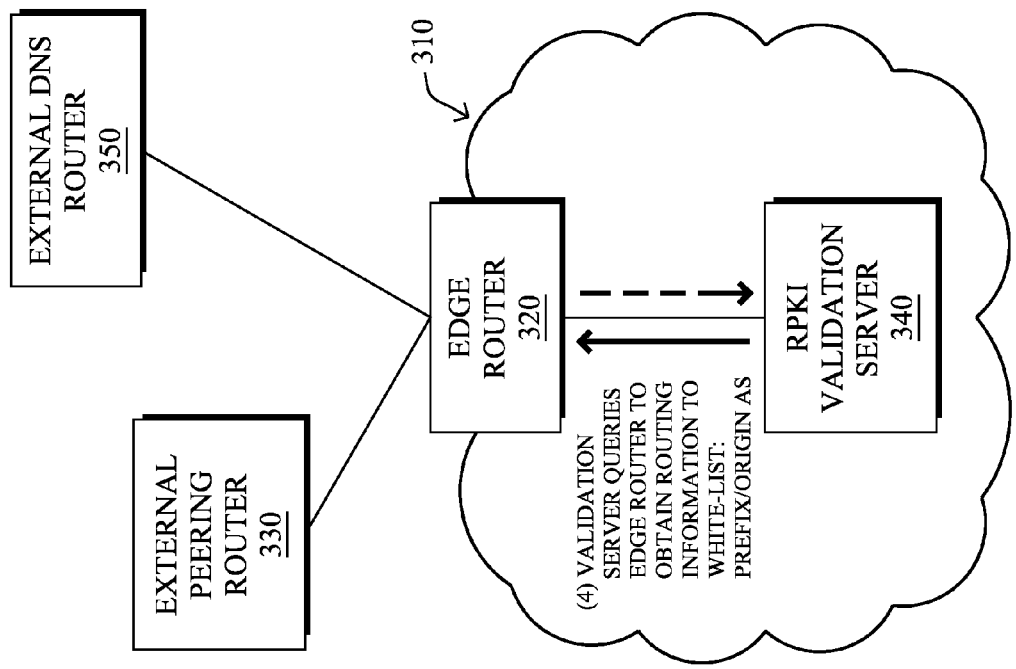
Figure 4C:
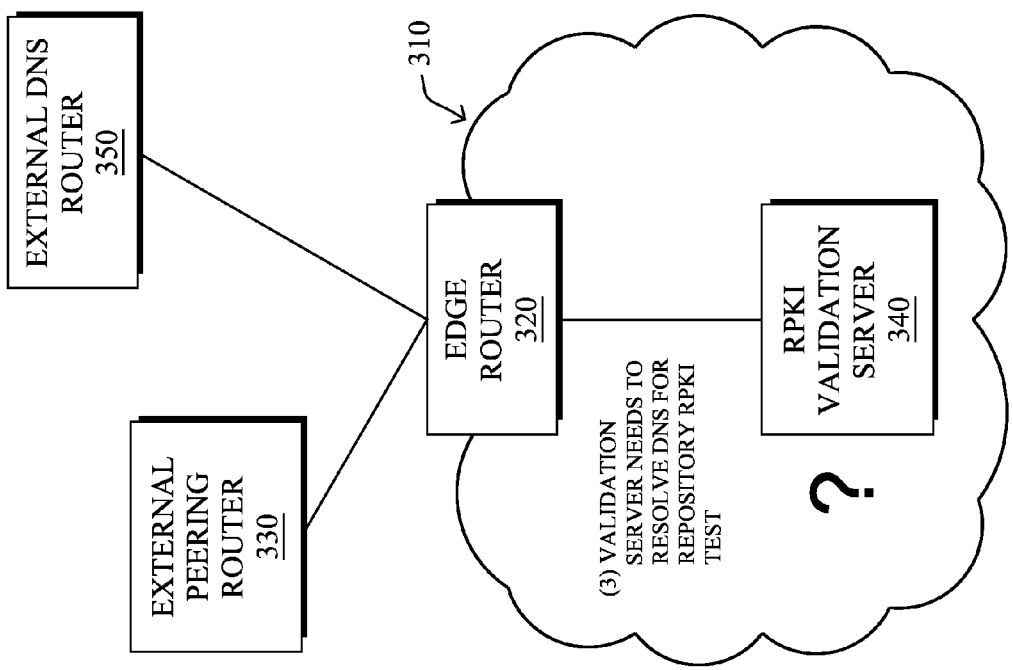

As shown in FIG. 4C (step 3), the validation server 340 needs to resolve the DNS for the RPKI repository (e.g., repository.rpki.test). According to certain embodiments, the validation server has this information from the now locally hosted DNS and NTP servers.

To learn which IP prefix, origin AS, and/or PKI information (e.g., Key hash) to white-list, the validation server may use a variety of methods. On one side, as shown in FIG. 4D (step 4), the validation (cache) server could query the edge routers themselves, such as by using a programmatic interface (e.g., APIs, remote CLI execution, etc.) on the BGP information the edge router is currently receiving from its peers. That is, as the validation server has no information on the current inter-domain routing status as viewed from the edge router, it queries the router to obtain its BGP table information for the required IP address. Alternatively, in one embodiment, the validation server could store the last known valid ROAs for all the critical resources it needs to access, and may use that information to create the white-listing information, accordingly.

Figure 4F:
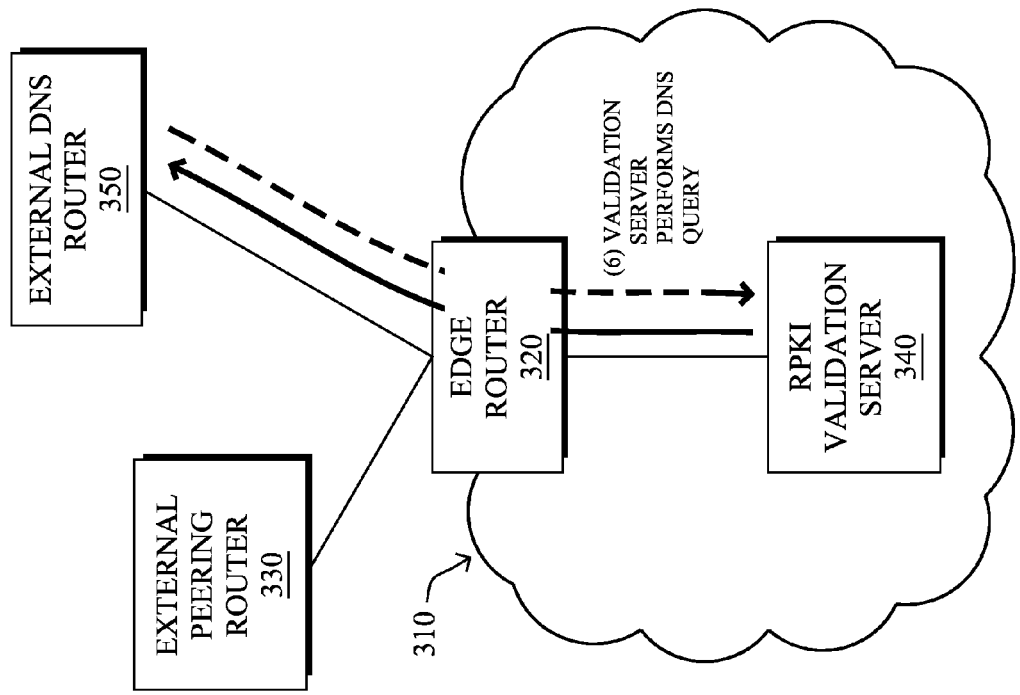
Figure 4E:
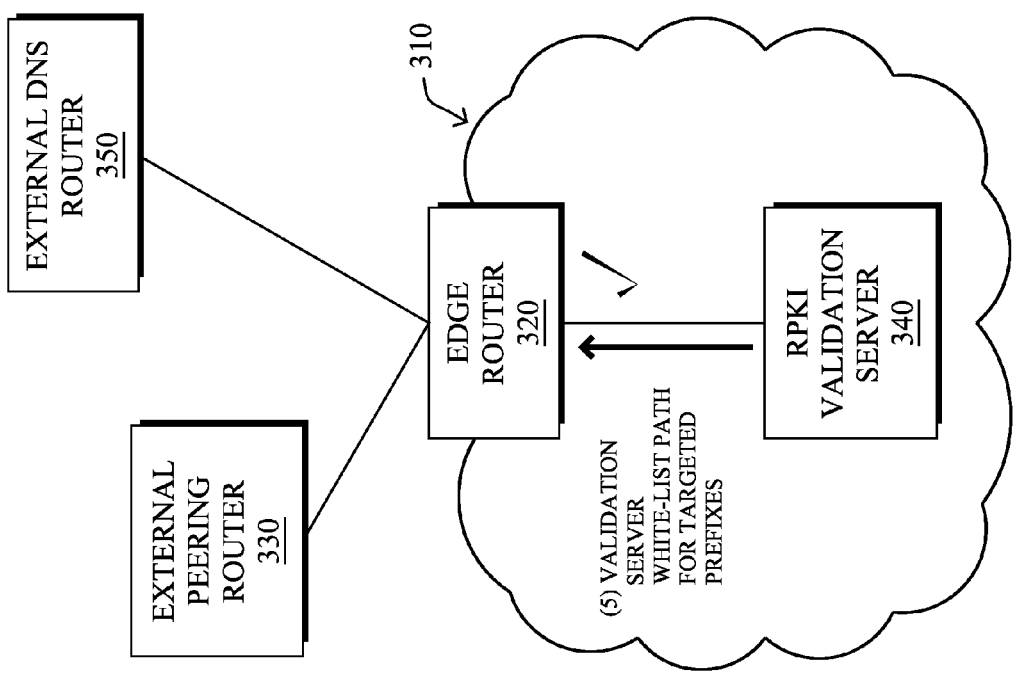

With the information provided by the router (e.g., IP prefix/length and ASPATH), the validation server is able to create dynamic white-listing as shown in FIG. 4E (step 5) To allow access to particular IP addresses beyond the edge router in question. In particular, as the validation server only generally needs access to one IP address in the range described by the prefix (i.e., the IP address of the desired external server), the RPKI validation server can also signal the specific address of interest to the edge routers. The routers themselves could then introduce data plane policy. As an example, if the DNS server of interest has IP address 10.1.1.1 and the prefix announced by neighbors is 10.0.0.0/8, the routers may allow (white-list) the route 10.0.0.0/8 in the routing table, but could allow only DNS traffic to and from the host 10.1.1.1, such as based on deep packet inspection (DPI) techniques (packet type, class, source/destination pair, etc.).

Figure 4G:
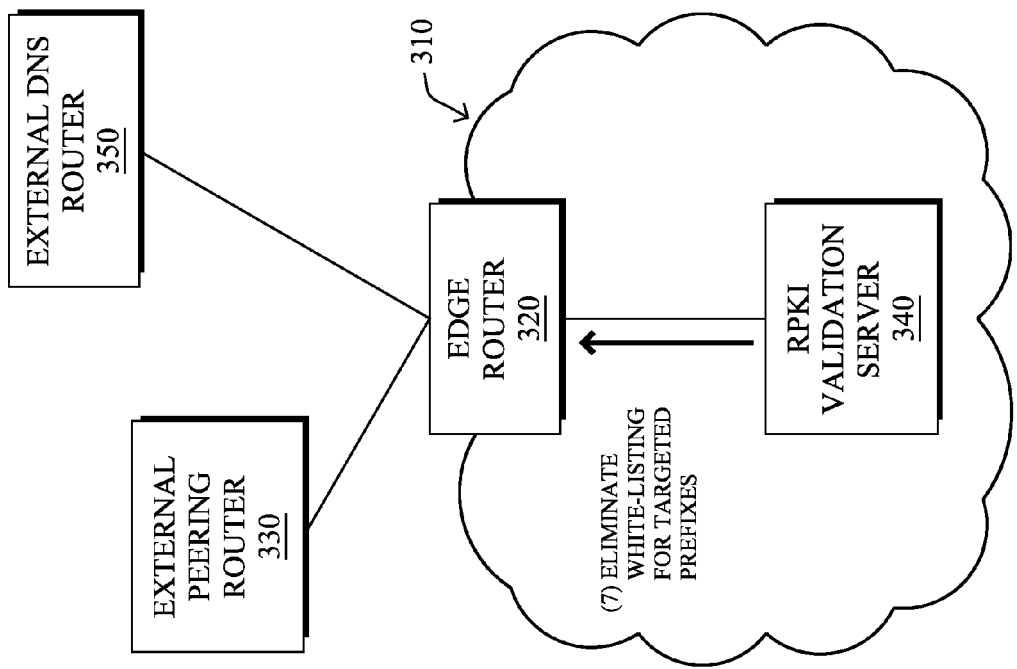

Once the validation server has converged to a steady state in its validation process, such as through performing a DNS query in FIG. 4F (step 6), it may remove the policies as in FIG. 4G (step 7), thereby eliminating the white-listing for targeted prefixes. Notably, though a single DNS server 350 is shown, the techniques herein may repeat steps 4-7 for all DNS servers, NTP servers, and RPKI repository servers, accordingly.

Certain embodiments of the present disclosure generally rely on the assumption that the bootstrapping edge router is not currently being targeted by either an origin or an AS_path hijack event at the time the white-list is created. As both the DNS information (using DNSSEC) and the RPKI information is signed, there is, however, little or no risk for impersonation.

Figure 5:
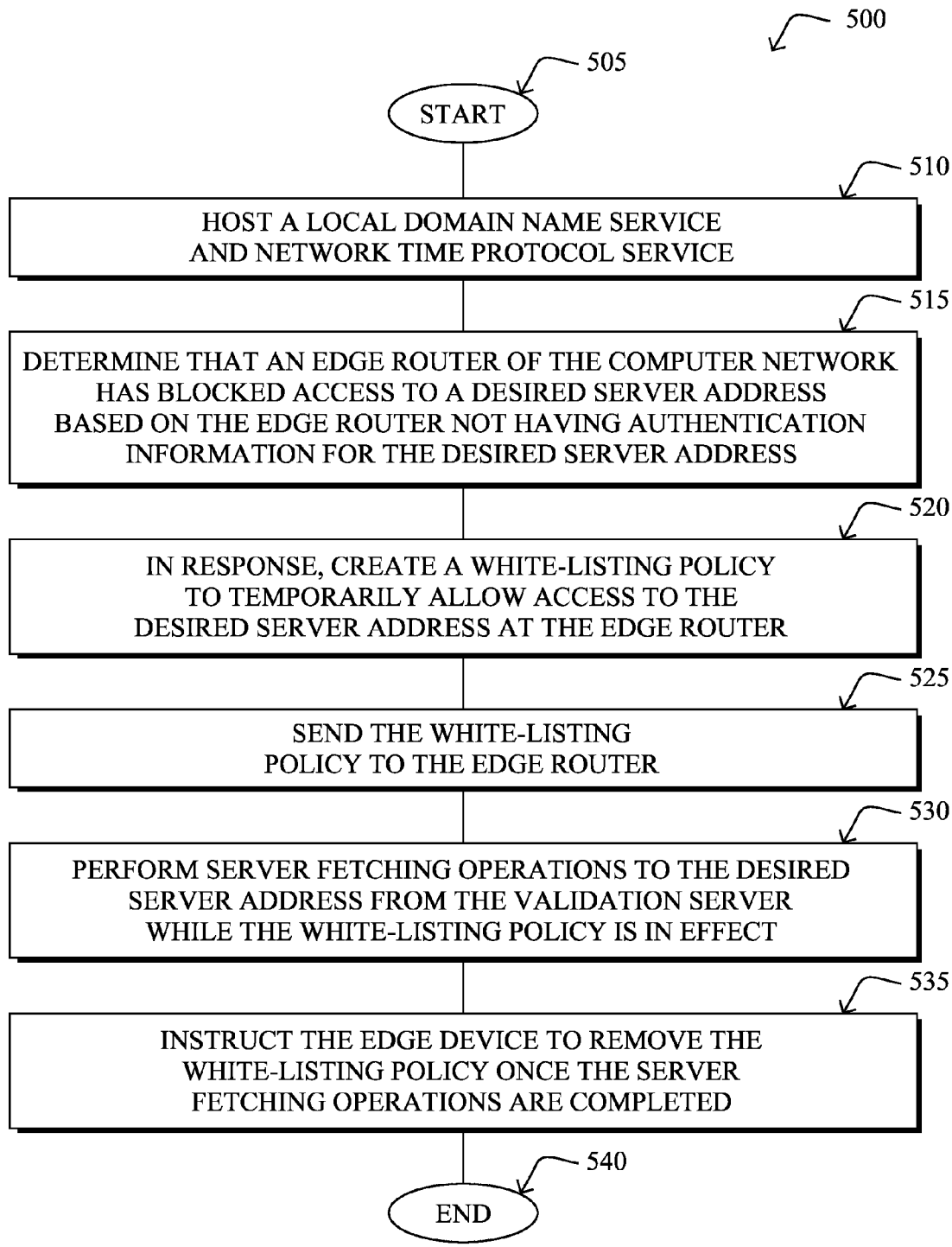
FIG. 5 illustrates an example simplified procedure for overcoming circular dependencies, particularly from the perspective of a validation server.

FIG. 5 illustrates an example simplified procedure for overcoming circular dependencies when bootstrapping an RPKI site in accordance with one or more embodiments described herein, particularly from the perspective of a validation server (e.g., an RPKI validation server). The procedure 500 may start at step 505, and continues to step 510, where, as described in greater detail above, the validation server hosts a local domain name service and network time protocol service, and, for example, may service one or a plurality of edge devices within the computer network.

In step 515, upon determining that an edge router of the computer network has blocked access to a desired server address based on the edge router not having authentication information for the desired server address (e.g., querying the edge router for its routing table authentication information to find where the edge router blocks access based on setting routing origin states to one of either "NOT FOUND" or "INVALID"), then in step 520 the server creates a white-listing policy to temporarily allow access to the desired server address at the edge router. As described above, the white-listing policy may list one or more of an IP prefix, an origin autonomous system (AS), an AS path, a public key infrastructure (PKI) information, and a PKI key hash. Also, as noted above, the validation server may determine which addresses to which the white-listing policy is to be applied based on stored and previously valid address information.

In step 525, the validation server sends the white-listing policy to the edge router (e.g., using an RPKI RTR protocol message payload), and may optionally signal to the edge router a specific desired server address within a range of addresses associated with the white-list policy. In one embodiment, it may be possible for the validation server to first ensure that the edge router is not in a targeted hijacked state prior to sending the white-listing policy.

In step 530, the validation server may proceed with performing server fetching operations to the desired server address while the white-listing policy is in effect (e.g., server fetching operations being one or more of DNS lookups, NTP lookups, and RPKI repository lookups), and then in step 535 may instruct the edge device to remove the white-listing policy once the server fetching operations are completed, and the simplified procedure 500 ends in step 540.

Figure 6:
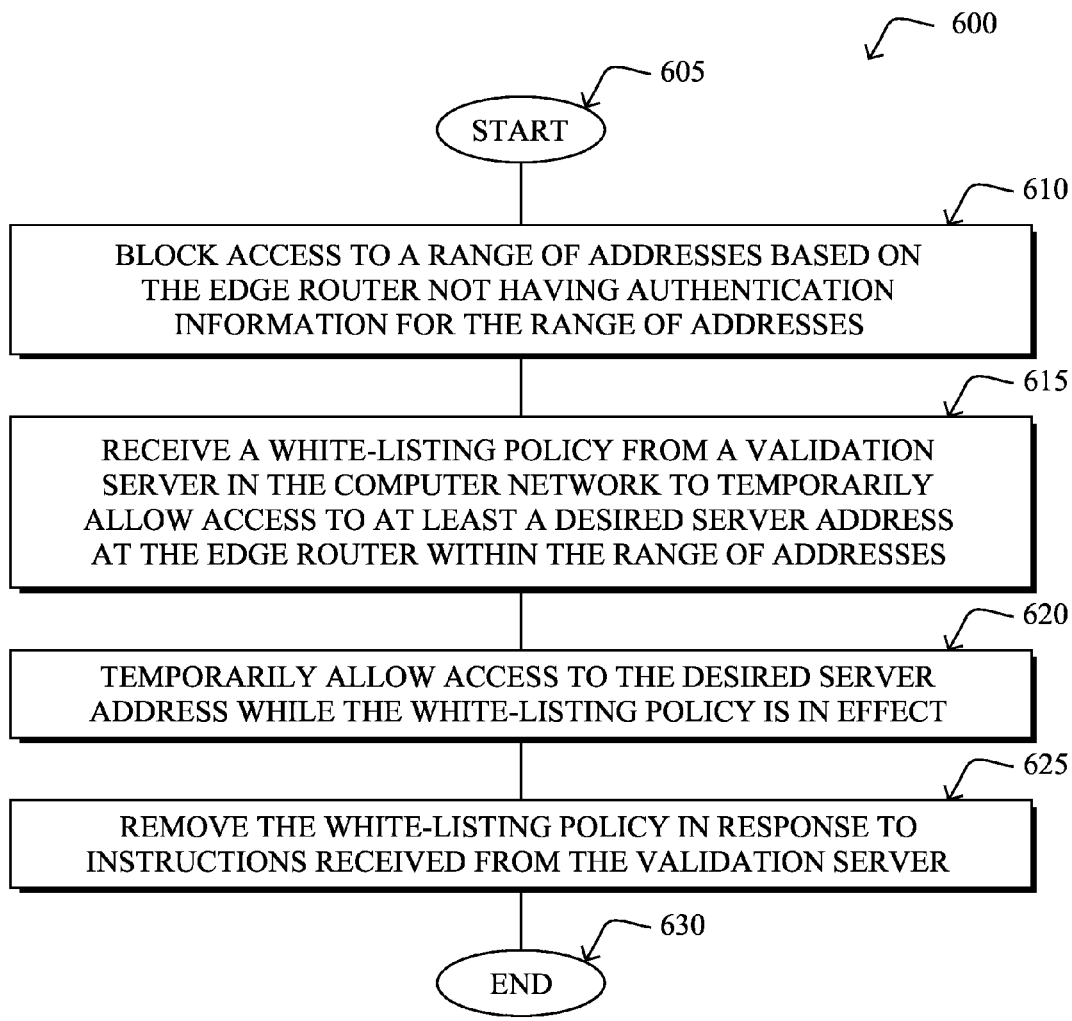
FIG. 6 illustrates another example simplified procedure for overcoming circular dependencies, particularly from the perspective of an edge router.

In addition, FIG. 6 illustrates an example simplified procedure for overcoming circular dependencies when bootstrapping an RPKI site in accordance with one or more embodiments described herein, particularly from the perspective of an edge device. The procedure 600 may start at step 605, and continues to step 610, where, as described in greater detail above, the edge router blocks access to a range of addresses based on the edge router not having authentication information for the range of addresses. In response to receiving a white-listing policy from a validation server in the computer network to temporarily allow access to at least a desired server address at the edge router within the range of addresses in step 615, the edge router complies in step 620 while the white-listing policy is in effect. In response to instructions received from the validation server in step 625, the edge router may then remove the white-listing policy, accordingly, and the simplified procedure 600 ends in step 630.

While certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

Certain embodiments described herein, therefore, provide for overcoming circular dependencies when bootstrapping an RPKI site. In particular, certain embodiments allow service providers to dynamically white-list selective "holes" within an edge router's access list to provide access to RPKI data for its cache servers. In this manner, service providers can safely drop a "not found" announcement or else use the "INVALID" path feature of the current BGPSEC proposal, without fearing blocking RPKI access, while avoiding simply allowing "any" prefix. Notably, certain embodiments alleviate cumbersome and static manual configuration of acceptable routes, due to the dynamic control-plane-based nature of the techniques as described above.

While there have been shown and described illustrative embodiments that may overcome circular dependencies when bootstrapping an RPKI site, it is to be understood that various other adaptations and modifications may be made within the spirit and scope of the embodiments herein. For example, the embodiments have been shown and described herein with relation to BGP-configured networks. However, the embodiments in their broader sense are not as limited, and may, in fact, be used with other types of inter-AS/domain protocols. That is, while certain protocols are shown, such as BGP Origin AS Validation and BGPSEC, other suitable protocols may be used, accordingly. Also, while certain authentication/validation protocols are shown, such as, in particular, the RPKI protocol, other similar protocols may make use of the techniques herein, and thus RPKI is not meant to be limiting to the scope of the disclosure herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
 hosting, at a validation server, a local domain name service and network time protocol service;
 determining, by the validation server in a computer network, that an edge router of the computer network is blocking access to a desired server address based on the edge router not having authentication information for the desired server address;
based on determining that the edge router is blocking access, dynamically creating at and by the validation server itself, a white-listing policy to temporarily allow access to the desired server address at the edge router, wherein the validation server uses the local domain name service and network time protocol service to create the white-listing policy;
sending, by the validation server, the white-listing policy to the edge router;
performing server fetching operations to the desired server address from the validation server while the white-listing policy is in effect; and
sending instructions from the validation server to the edge device to remove the white-listing policy once the server fetching operations are completed.

2. The method as in claim 1, wherein determining that the edge router has blocked access to the desired server address comprises:
querying the edge router for its routing table authentication information.

3. The method as in claim 1, wherein the edge router blocks access based on setting routing origin states to one of either "NOT FOUND" or "INVALID".

4. The method as in claim 1, wherein the validation server is a Resource Public Key Infrastructure (RPKI) validation server.

5. The method as in claim 1, wherein the server fetching operations are at least one of domain name service (DNS) lookups; network time protocol (NTP) lookups; or Resource Public Key Infrastructure (RPKI) repository lookups.

6. The method as in claim 1, wherein the white-listing policy lists one or more of an IP prefix, an origin autonomous system (AS), an AS path, a public key infrastructure (PKI) information, and a PKI key hash.

7. The method as in claim 1, further comprising:
determining which addresses to which the white-listing policy is to be applied based on stored and previously valid address information.

8. The method as in claim 1, wherein sending the white-listing policy to the edge router comprises:
using a Resource Public Key Infrastructure (RPKI) router (RTR) protocol message payload.

9. The method as in claim 1, further comprising:
ensuring that the edge router is not in a targeted hijacked state prior to sending the white-listing policy.

10. The method as in claim 1, further comprising:
signaling to the edge router a specific desired server address within a range of addresses associated with the white-list policy.

11. The method as in claim 1, further comprising:
servicing, by the validation server, a plurality of edge devices within the computer network.

12. An apparatus, comprising:
one or more network interfaces to communicate within a computer network;
a processor coupled to the network interfaces and configured to execute one or more processes; and
a memory configured to store a process executable by the processor, the process when executed operable to:
host, as a validation server, a local domain name service and network time protocol service;
determine that an edge router of the computer network is blocking access to a desired server address based on the edge router not having authentication information for the desired server address;
based on determining that the edge router is blocking access, dynamically create a white-listing policy to temporarily allow access to the desired server address at the edge router, wherein the validation server uses the local domain name service and network time protocol service;
send the white-listing policy to the edge router;
perform server fetching operations to the desired server address from the validation server while the white-listing policy is in effect; and
send instructions to the edge device to remove the white-listing policy once the server fetching operations are completed,
wherein the apparatus is a validation server.

13. The apparatus as in claim 12, wherein the process when executed to determine that the edge router has blocked access to the desired server address is further operable to:
query the edge router for its routing table authentication information.

14. The apparatus as in claim 12, wherein the validation server is a Resource Public Key Infrastructure (RPKI) validation server.

15. The apparatus as in claim 12, wherein the server fetching operations are at least one of domain name service (DNS) lookups; network time protocol (NTP) lookups; or Resource Public Key Infrastructure (RPKI) repository lookups.

16. The apparatus as in claim 12, wherein the white-listing policy lists one or more of an IP prefix, an origin autonomous system (AS), an AS path, a public key infrastructure (PKI) information, and a PKI key hash.

17. The apparatus as in claim 12, wherein the process when executed is further operable to:
determine which addresses to which the white-listing policy is to be applied based on stored and previously valid address information.

18. The apparatus as in claim 12, wherein the process when executed is further operable to:
signal to the edge router a specific desired server address within a range of addresses associated with the white-list policy.

19. A method, comprising:
blocking access to a range of addresses by an edge router in a computer network based on the edge router not having authentication information for the range of addresses;
receiving a white-listing policy from a validation server in the computer network hosting a local domain name service and network time protocol service, wherein the white-listing policy is dynamically created at and by the validation server itself to temporarily allow access to at least a desired server address at the edge router within the range of addresses, wherein the validation server uses the local domain name service and network time protocol service to create the white-list policy;
temporarily allowing access to the desired server address while the white-listing policy is in effect; and
removing the white-listing policy in response to instructions received from the validation server.

20. The method as in claim 19, wherein the edge router blocks access based on setting routing origin states to one of either "NOT FOUND" or "INVALID".

21. The method as in claim 19, wherein the validation server is a Resource Public Key Infrastructure (RPKI) validation server.

\* \* \* \* \*